April 21, 1931.   C. E. DANIEL   1,802,200
THERMOSTATICALLY CONTROLLED VALVE
Filed Dec. 6, 1928

WITNESSES
Edw. Thorpe
Hugh H. Ott

INVENTOR
C. E. Daniel
BY
Munn & Co.
ATTORNEY

Patented Apr. 21, 1931

1,802,200

UNITED STATES PATENT OFFICE

CHARLES E. DANIEL, OF BRONXVILLE, NEW YORK

THERMOSTATICALLY-CONTROLLED VALVE

Application filed December 6, 1928. Serial No. 324,160.

This invention relates to automatically controlled valves, and more particularly to a thermostatically controlled valve.

The invention broadly comprehends a thermostatic control for use in connection with valves which regulate the flow of a heated fluid therethrough, such as steam, hot water or the like.

More particularly, the invention contemplates a valve of this character including a normally open or unseated valve element having pressure operable means for closing or seating the same, in which the pressure necessary is produced by the expansion and gasification of a liquid having a comparatively low boiling point.

One of the outstanding features of the present invention resides in the provision of a thermostatically controlled means for closing a normally open valve, which means includes a gasifying chamber heated by the fluid in the outlet portion of the valve and in which chamber is arranged pressure operable means for closing the valve, together with a thermal fluid container communicating with said chamber whereby the thermal fluid upon expansion under a predetermined temperature is introduced to said chamber for gasification to produce the necessary pressure for operating the valve closing means.

A further feature of the invention embodies the provision of a condensing chamber insulated from and superimposed with respect to the gasifying chamber for receiving the gasified thermal liquid for condensation and return to the thermal liquid container.

A still further feature of the invention resides in the provision of a gasifying chamber which is defined partially by a wall of the outlet compartment of the valve casing and in which chamber is arranged a pressure operable means for closing the valve whereby expansion of a thermal liquid to convey a portion of the same into said chamber for gasification by the heat of the valve casing wall produces the necessary pressure required for closing the valve.

As a further object, the invention comprehends in a thermostatically controlled valve of the character set forth a thermal liquid container, the capacity of which is manually adjustable to afford means for regulating the temperature at which the valve will close.

The invention further aims to provide a simple, practical, efficient and inexpensive thermostatically controlled valve or valve controlling mechanism.

With the above recited and other objects in view, reference is had to the following description and accompanying drawings, in which there is exhibited one example or embodiment of the invention, while the claims define the actual scope of the same.

Figure 1:
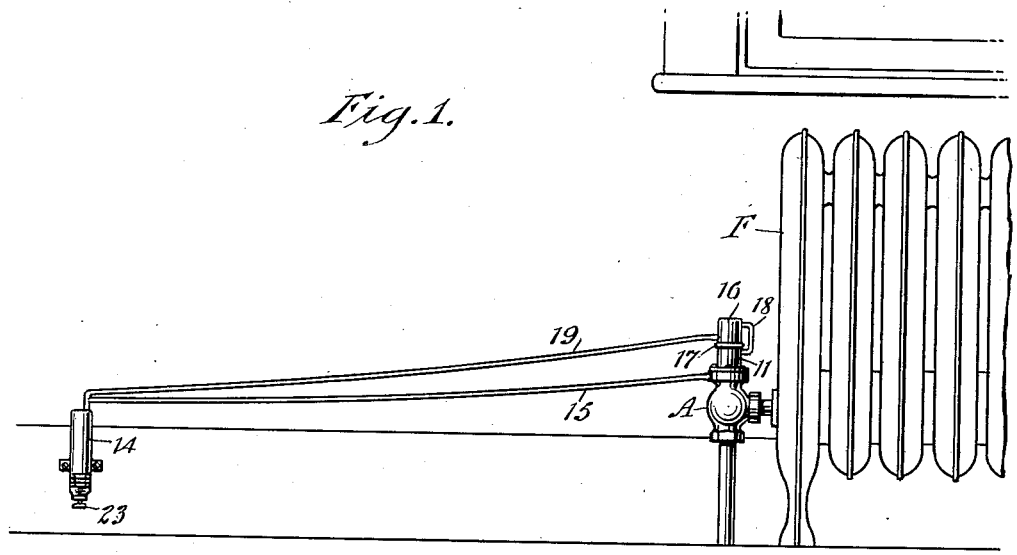
Figure 1 illustrates a thermostatically controlled valve constructed in accordance with the invention as applied to a radiator.
Figure 3:
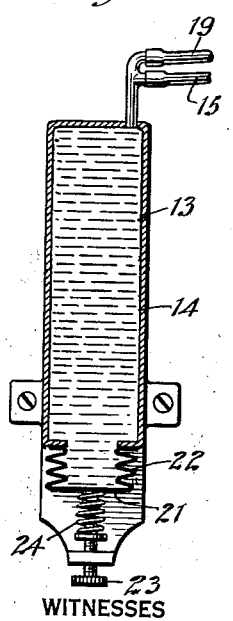
Figure 3 is a vertical sectional view of the thermal liquid container.
Figure 2:
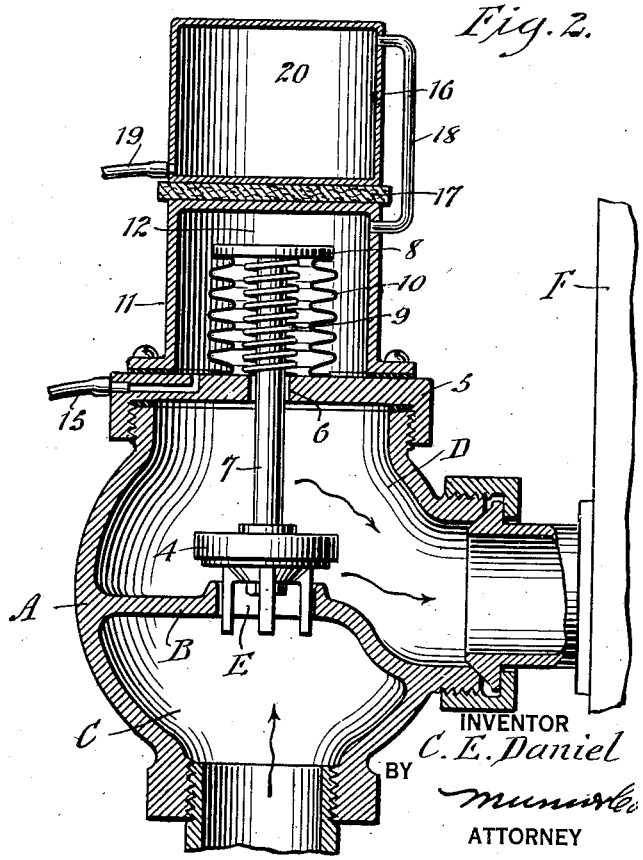
Figure 2 is an enlarged vertical sectional view of the valve in its normal open position.

Referring to the drawings by characters of reference, A designates generally a valve casing which is subdivided by a partition B into inlet and outlet compartments C and D, the partition B being provided with an opening or passage E adapted to be respectively closed and opened by a valve element 4. The valve casing is provided with a cap 5 having an opening 6 through which the valve stem 7 extends and the upper end of the valve stem is formed with a plunger head 8. A spring 9 encircles the protruding end of the valve stem and is interposed between the cap 5 and the head 8 for normally exerting a tension which effects the unseating of the valve element 4 and opening of the valve. A bellows 10 is connected respectively to the plunger head 8 and the cap 5 to prevent leakage of the fluid from the valve casing. An inverted cup shaped receptacle 11 is secured to the cap 5 to define, together with said cap, a chamber 12. A closed container 13 is provided and holds a predetermined quantity of a thermal liquid 14, and said container communicates with the chamber 12 through a conduit 15 leading from its upper end to the lower end of the chamber 12. A receptacle 16 superposed with respect to the chamber 12 and suitably insulated therefrom, such as by an insulating member 17, has communication with the upper end of the chamber 12 by a conduit 18, the said conduit opening into the receptacle 16 adjacent its upper end. A conduit 19 leads from the lower end of the receptacle 16 to the upper end of the thermal liquid container 13.

In operation, with the valve element 4 unseated, the heated fluid passes through the passage or opening E to the radiator F, and when the temperature in the room reaches a predetermined degree the thermal liquid will expand and flow through the conduit 15 into the chamber 12 where contact with the heated cap 5 will cause the same to boil and gasify in said chamber. When the gasification of the thermal liquid is more rapid than the condensation of the liquid vapor in the chamber 20, pressure will be exerted on the plunger head 8 to overcome the tension of the spring 9, thereby causing the valve element 4 to be seated to cut off the heated fluid supply to the radiator F. As the temperature of the room decreases, the flow of the liquid to the chamber 12 will be decreased and more vapor will be condensed in the chamber 20 than is vaporized in the chamber 12. The pressure in the chamber 12 will, therefore, be decreased and the valve stem will be allowed to rise. In view of the fact that the condensing chamber is cooler, it is obvious that the gasified thermal liquid will be condensed and will flow by gravity through the conduit 19 and back into the thermal liquid container 13. Under normal operating conditions, the liquid will always flow in one direction, but the rate of flow will be decreased by a drop in the room temperature, and as previously explained, when the rate of flow is less than the rate at which the condensation of the liquid vapor occurs the valve will open, and conversely, when the rate of flow is increased and the vaporization or gasification of the thermal liquid is more rapid than the condensation of the liquid vapor a pressure will be exerted to close the valve.

In order to provide means to render the device adjustable for the purpose of causing it to act at varying temperatures, the thermal liquid container 13 is capable of any suitable adjustment, such as the provision of a bottom wall 21 which is connected by bellows side walls 22 to the lower end of the container body. A suitable adjusting screw 23 functions to raise or lower the bottom wall 21 for this purpose. In practice, a coiled expansion spring 24 may be interposed between the bottom wall and the adjusting screw to allow additional expansion of the liquid after the valve element 4 is seated. The thermal liquid may consist of ether or alcohol, both of which have a relatively low boiling point.

While the valve and its controlling means heretofore described has been illustrated and is ideally adapted for use in connection with hot water, steam or vapor radiators, it is, nevertheless, to be understood that the valve may be used for any purpose where it is desired to control the flow of a heated fluid.

What is claimed is:

1. In a valve for regulating the flow of a heating fluid therethrough, means for normally opening and maintaining said valve in an open condition and thermostatically controlled means for closing the same comprising a chamber partially defined by a wall of the outlet compartment of the valve for heating the chamber by the passage of the heated fluid through the valve, pressure responsive means independent of the said wall for closing the valve arranged in said chamber and a heat responsive liquid supply adapted to be introduced by expansion thereof under a predetermined temperature, into said chamber for gasification to produce the pressure necessary to operate the valve closing means.

2. In a valve for regulating the flow of a heated fluid therethrough, means for normally opening and maintaining said valve in an open condition and thermostatically controlled means for closing the same comprising a chamber partially defined by a wall of the outlet compartment of the valve for heating the chamber by the passsage of the heated fluid through the valve, pressure responsive means for closing the valve arranged in said chamber and a heat responsive liquid supply adapted to be introduced by expansion thereof under a predetermined pressure, into said chamber for gasification to produce the pressure necessary to operate the valve closing means and an insulated superposed condensing chamber having communication at its upper end with the upper end of the gasification chamber and having communication at its lower end with the upper end of the thermal fluid supply for receiving the gasified thermal liquid and returning the same to the thermal liquid supply gravitationally.

3. A thermostatic controlling means including a pressure operated device, a chamber into which the pressure operating means extends, a thermal liquid reservoir communicating with said chamber and into which thermal liquid is fed by expansion of the same for heating and gasification in the chamber to operate the pressure responsive means and an insulated superposed condensing chamber for receiving, condensing and returning the gasified thermal fluid to its reservoir.

4. A thermostatic controlling means including a pressure operated device, a chamber into which the pressure operating device extends, a thermal liquid reservoir communicating with said chamber and into which the thermal liquid is fed by expansion of the same for heating and gasification in the chamber to operate the pressure responsive means and an insulated superposed condensing chamber for receiving, condensing and returning the gasified thermal fluid to its reservoir, said reservoir being adjustable to increase and decrease its capacity for regulating the temperature at which the thermal liquid will be introduced by expansion to the gasifying chamber.

5. A thermostatically operable controlling attachment for valves of the type which regulate the flow of a heated fluid therethrough comprising a chamber defined by a wall of the outlet compartment of the valve casing, in which chamber extends a pressure responsive means for closing the valve and means for conveying a thermal liquid to said chamber for gasification by the heat of said valve casing wall to produce the necessary pressure for closing the valve.

6. The combination with a valve for regulating the flow of a heated fluid therethrough and means for normally opening and maintaining said valve in an open condition, a chamber partially defined by a wall of the outlet portion of the valve, pressure responsive valve closing means extending in the chamber, a thermal liquid reservoir communicating with said chamber for introducing a portion of the thermal liquid contained therein by expansion of the liquid in the reservoir for gasification of the same in said chamber to produce the pressure for actuating the pressure responsive valve closing means.

7. The combination with a valve for regulating the flow of a heated fluid therethrough and means for normally opening and maintaining said valve in an open condition, a chamber partially defined by a wall of the outlet portion of the valve, pressure responsive valve closing means arranged in the chamber, a thermal liquid reservoir communicating with said chamber for introducing a portion of the thermal liquid contained therein by expansion of the liquid in the reservoir for gasification of the same in said chamber to produce the pressure for actuating the pressure responsive valve closing means and a superposed insulated chamber communicating with the gasifying chamber for condensing the gasified thermal liquid and for gravitationally returning said condensed gasified thermal liquid to its reservoir.

8. The combination with a valve for regulating the flow of a heated fluid therethrough and means for normally opening and maintaining said valve in an open condition, a chamber partially defined by a wall of the outlet portion of the valve, pressure responsive valve closing means arranged in the chamber, a thermal liquid reservoir communicating with said chamber for introducing a portion of the thermal liquid contained therein by expansion of the liquid in the reservoir for gasification of the same in said chamber to produce the pressure for actuating the pressure responsive valve closing means and a superposed insulated chamber communicating with the gasifying chamber for condensing the gasified thermal liquid and for gravitationally returning said condensed gasified thermal liquid to its reservoir, said reservoir being adjustable to regulate the temperature at which the thermal liquid will be supplied by expansion to the gasifying chamber.

9. In a valve for regulating the flow of a heated fluid therethrough, means for normally opening and maintaining said valve in an open condition and thermostatically controlled means for closing the same comprising a chamber positioned to be heated by the passage of a heating fluid through the valve, pressure responsive means for operating the valve arranged in said chamber and a heat responsive liquid supply adapted to be introduced by expansion thereof under a predetermined pressure, into said chamber for gasification to produce the pressure necessary to operate the valve closing means, and an insulated superposed condensing chamber having communication with the gasification chamber and also having communication with the thermal liquid supply for receiving the gasified thermal liquid and returning the same to the thermal liquid supply.

10. A thermostatically operable controlling attachment for valves of the type which regulate the flow of a heated fluid therethrough comprising a chamber, means operable by pressure in the chamber for operating the valve, means open at all times for conveying a thermal liquid to the said chamber for gasification, independent means for leading the gasified thermal liquid from the chamber, and means for condensing the gasified thermal liquid in the said independent means.

11. A thermostatically operable controlling attachment for valves of the type which regulate the flow of a heated fluid therethrough comprising a chamber, means operable by pressure in the chamber for operating the valve, means open at all times for conveying a thermal liquid to the said chamber for gasification, and independent means for leading the gasified thermal liquid from the chamber.

12. In a valve for regulating the flow of a heated fluid therethrough, means for normally opening and maintaining said valve in an open condition and thermostatically controlled means for closing the same comprising a chamber partially defined by a wall of the outlet compartment of the valve for heating the chamber by the passage of the heated fluid through the valve, pressure responsive means for closing the valve arranged in said chamber, and a heat responsive liquid supply adapted to be introduced by expansion thereof under a predetermined temperature into said chamber for gasification to produce the pressure necessary to operate the valve closing means.

CHARLES E. DANIEL.